United States Patent
Brown et al.

(10) Patent No.: US 7,269,649 B1
(45) Date of Patent: Sep. 11, 2007

(54) PROTOCOL LAYER-LEVEL SYSTEM AND METHOD FOR DETECTING VIRUS ACTIVITY

(75) Inventors: Martin A. Brown, Bicester (GB); Vincent P. Gullotto, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 895 days.

(21) Appl. No.: 09/968,098

(22) Filed: Sep. 28, 2001

Related U.S. Application Data

(60) Provisional application No. 60/316,670, filed on Aug. 31, 2001.

(51) Int. Cl.
*G06F 15/173* (2006.01)
*H04L 9/32* (2006.01)
*G08B 23/00* (2006.01)

(52) U.S. Cl. .................. 709/224; 709/223; 709/225; 726/2; 726/22; 726/26

(58) Field of Classification Search ........ 709/223–225; 726/2, 22, 26
See application file for complete search history.

(56) References Cited

U.S. PATENT DOCUMENTS

| | | | | |
|---|---|---|---|---|
| 5,623,600 A | * | 4/1997 | Ji et al. | 713/201 |
| 5,960,170 A | * | 9/1999 | Chen et al. | 714/38 |
| 5,968,176 A | * | 10/1999 | Nessett et al. | 713/201 |
| 6,061,796 A | * | 5/2000 | Chen et al. | 726/15 |
| 6,088,803 A | * | 7/2000 | Tso et al. | 713/201 |
| 6,088,804 A | * | 7/2000 | Hill et al. | 713/201 |
| 6,167,445 A | * | 12/2000 | Gai et al. | 709/223 |
| 6,219,706 B1 | * | 4/2001 | Fan et al. | 706/225 |
| 6,658,458 B1 | * | 12/2003 | Gai et al. | 709/215 |
| 6,671,729 B1 | * | 12/2003 | Gordon et al. | 709/227 |
| 6,971,028 B1 | * | 11/2005 | Lyle et al. | 726/25 |
| 6,990,591 B1 | * | 1/2006 | Pearson | 726/22 |
| 2002/0107953 A1 | * | 8/2002 | Ontiveros et al. | 709/224 |
| 2002/0174208 A1 | * | 11/2002 | Morlitz | 709/223 |
| 2003/0028806 A1 | * | 2/2003 | Govindarajan et al. | 713/201 |
| 2003/0051026 A1 | * | 3/2003 | Carter et al. | 709/224 |
| 2004/0010718 A1 | * | 1/2004 | Porras et al. | 713/201 |

FOREIGN PATENT DOCUMENTS

| | | |
|---|---|---|
| JP | 11-167487 | 6/1999 |
| WO | WO 97/49252 | 12/1997 |

* cited by examiner

*Primary Examiner*—Nathan Flynn
*Assistant Examiner*—Joshua Joo
(74) *Attorney, Agent, or Firm*—Zilka-Kotab, PC; Christopher J. Hamaty

(57) ABSTRACT

A system, method and computer program product for detecting network activity governed by malicious code is provided. A protocol layer associated with data communications over a network is monitored. A determination is made as to whether the data communications are prompted by malicious code based on the monitoring. A security event is initiated upon it being determined that the data communications are prompted by malicious code.

24 Claims, 7 Drawing Sheets

PROTOCOL LAYER-LEVEL SYSTEM AND METHOD FOR DETECTING VIRUS ACTIVITY

RELATED APPLICATION(S)

The present application claims priority from a provisional patent application filed Aug. 31, 2001 under Ser. No. 60/316,670, which is incorporated herein by reference.

FIELD OF THE INVENTION

The present invention relates to system security, and more particularly to efficient layer-based scanning of streaming data for malicious code.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is an on-going, ever changing, and increasingly complex problem.

Computer network attacks can take many forms and any one attack may include many security events of different types. Security events are anomalous network conditions each of which may cause an anti-security effect to a computer network. Security events include producing network damage through mechanisms such as viruses, worms, or Trojan horses and overwhelming the network's capability in order to cause denial of service, and so forth.

Generally, a computer virus is a program that is capable of attaching to other programs or sets of computer instructions, replicating itself, and performing unsolicited or malicious actions on a computer system. The damage done by computer viruses, including trojans, may range from mild interference with a program, such as the display of an unwanted political message in a dialog box, to the complete destruction of data on a user's hard drive.

In many cases users utilize a security system such as a personal firewall to protect themselves, or some intrusion detection software. Security systems often employ security risk-management tools, i.e. ""scanners,"" to search for known types of security events in the form of malicious programs such as viruses, worms, and Trojan horses. Further, scanners are used for content filtering to enforce an organization's operational policies, i.e. detecting harassing or pornographic content, junk e-mails, misinformation (virus hoaxes), etc.

FIG. 1 is a representation of a typical virus signature 100. As shown, the typical virus signature 100 has two components: a file component 102 used to scan a file system and a memory component 104 used to scan memory of the target device.

One problem of prior art is that anti-virus software is limited to actions and effects within the file system and memory of a device, because the virus signature files are limited to these. At the current time, there is no ability for anti-virus products to detect certain behaviors coming from outside these areas, and/or actions/intrusions taken by some malicious viral or code threats.

In addition, intrusion detection systems can be inaccurate when subjected to large amounts of data, resulting in missed viral detection and false alarms. Another disadvantage of the prior art is that scanning data coming into a network requires a substantial amount of resources. It is estimated that new viruses are created at a rate of over 100 per month. This rate has resulted in a need for tens of thousands of virus signatures to be searched in suspect data. This, in turn, has resulted in virus searching algorithms requiring a large amount of time and computer resources when scanning for virus signatures.

What is needed is a way to efficiently detect malicious code entering or leaving a system in a stream of data. What is also needed is a way to limit the analysis to known viruses, thereby substantially reducing the number of false alarms.

DISCLOSURE OF THE INVENTION

A system, method and computer program product for detecting network activity governed by malicious code is provided. A protocol layer associated with data communications over a network is monitored. A determination is made as to whether the data communications are prompted by malicious code based on the monitoring. A security event is initiated upon it being determined that the data communications are prompted by malicious code.

In one embodiment, the protocol layer is maintained by anti-malicious code software, such as anti-virus software. The protocol layer(s) can be positioned between OSI standard layers 2 and 3 and/or between OSI standard layers 4 and 5.

The data communications can be incoming data communications, i.e., originating outside the intranet and/or from a remote device. The data communications can also be outgoing data communications, i.e., originating from within the intranet and/or from a local device. The data communications can include streaming data.

In another embodiment, a signature file is used to determine whether the data communications are prompted by malicious code. The signature file includes multiple signatures of malicious code, at least a portion of which include port data. In yet another embodiment, the determination of whether the data communications are prompted by malicious code includes an analysis of port numbers to which the data communications are being sent utilizing a signature file having port signatures. A port signature is a listing or sequence of ports accessed by known instances of malicious code, most commonly trojans.

In a further embodiment, the security event is initiated upon matching of unique port numbers with a signature of the signature file. Which port numbers are considered unique can be predetermined. Further processing may be performed upon matching of non-unique port numbers with a signature of the signature file. Such further processing can include reassembling data of the data communications and scanning the reassembled data for malicious code. The security event can include terminating the data communications, discarding a packet of the data, and redirecting the data communications.

DESCRIPTION OF THE PREFERRED EMBODIMENTS

The present embodiment implements an extension to the existing concept of signature matching of malicious code through memory and file system scanning, to that of inserting a layer maintained and monitored by Anti-Virus (AV) software on the client, server or appliance to monitor malicious activity coming to and from the network from any device.

Malicious code includes any program that performs or attempts to perform any unauthorized act. For example, one type of malicious code is a virus. A virus is a software program that self-replicates recursively. Viruses may damage data, cause the computer to crash, display messages, or lie dormant. Another type of malicious code is a worm, which is a virus that usually replicates using computer networks, such as via email or Internet Relay Chat (IRC). Yet another type is a Trojan, a program that either pretends to have, or is described as having, a set of useful or desirable features, but actually contains a damaging payload. Malicious code is preferably detected via a scanner such as an Anti Virus (AV) scanner by recognizing a "signature" of the malicious code.

The present embodiment combines the use of signatures for memory and file detection with an analysis shim, or protocol layer, at a particular network layer to monitor viral activity. Thus, the present embodiment is not only able to determine if any viruses are resident in memory or attacking the file systems, but also determine, though data received from the network shim, if any viruses are attempting to send data out, or the machine is the target of a malware application.

Figure 2:
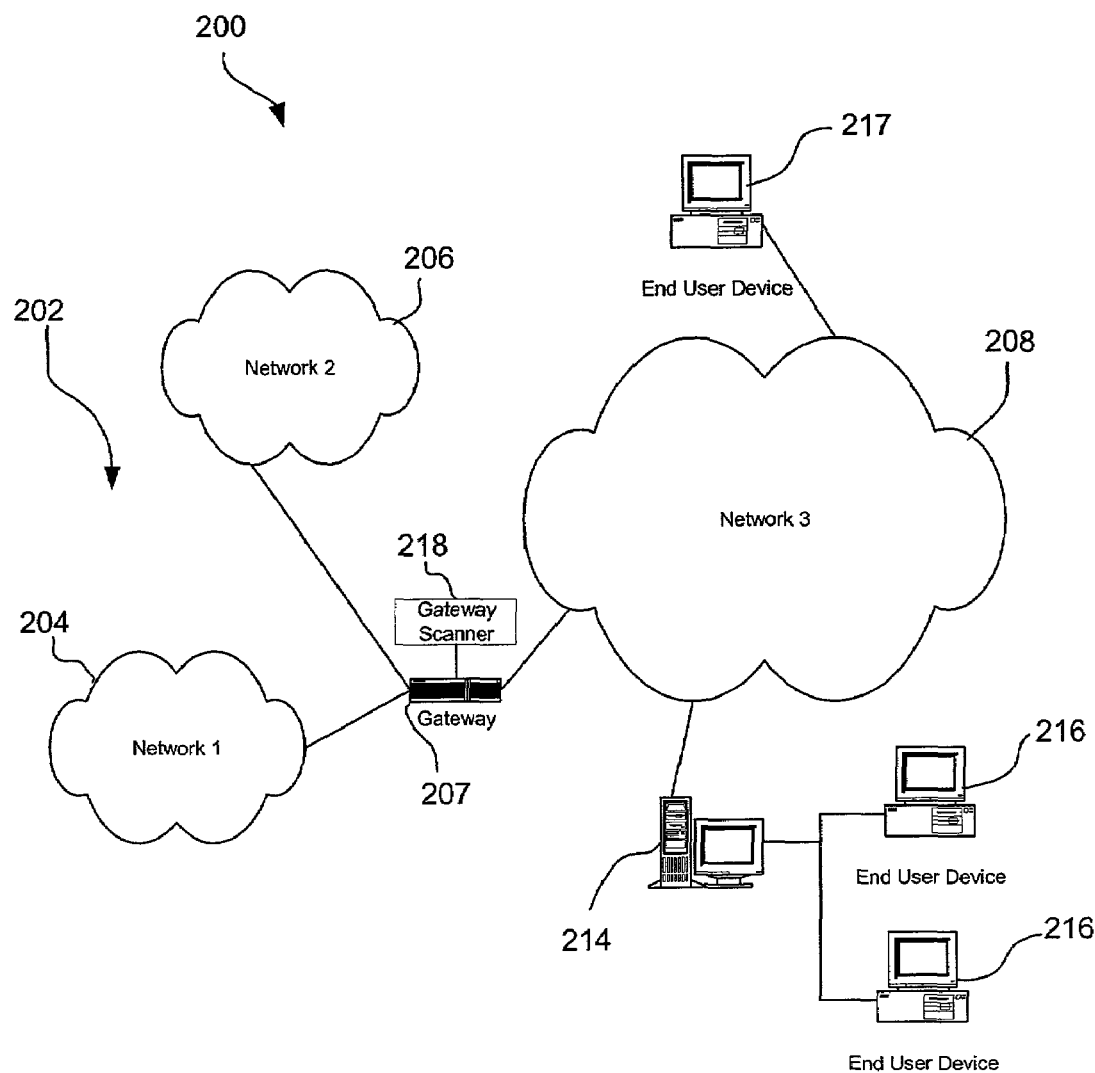
FIG. 2 illustrates a network architecture, in accordance with one embodiment.

FIG. 2 illustrates a network architecture 200, in accordance with one embodiment. As shown, a plurality of remote networks 202 are provided including a first remote network 204 and a second remote network 206. Also included is at least one gateway 207 coupled between the remote networks 202 and a proximate network 208. In the context of the present network architecture 200, the networks 204, 206, 208 may each take any form including, but not limited to a local area network (LAN), a wide area network (WAN) such as the Internet, etc.

In use, the gateway 207 serves as an entrance point from the remote networks 202 to the proximate network 208. As such, the gateway 207 may function as a router, which is capable of directing a given packet of data that arrives at the gateway 207, and a switch, which furnishes the actual path in and out of the gateway 207 for a given packet.

Further included is at least one data server 214 coupled to the proximate network 208, and which is accessible from the remote networks 202 via the gateway 207. It should be noted that the data server(s) 214 may include any type of computing device/groupware. Coupled to each data server 214 is a plurality of user devices 216. Such user devices 216 may include a desktop computer, lap-top computer, hand-held computer, printer or any other type of logic. It should be noted that a user device 217 may also be directly coupled to any of the networks, in one embodiment.

Further provided is a gateway scanner 218 coupled to the gateway 207. It should be noted that additional scanners may be utilized with any type of network element coupled to the networks 204, 206, 208. In the context of the present description, a network element may refer to any component of a network. In use, the scanner is capable of executing a scanning procedure. Details regarding such scanning procedure will be set forth hereinafter in greater detail.

Figure 3:
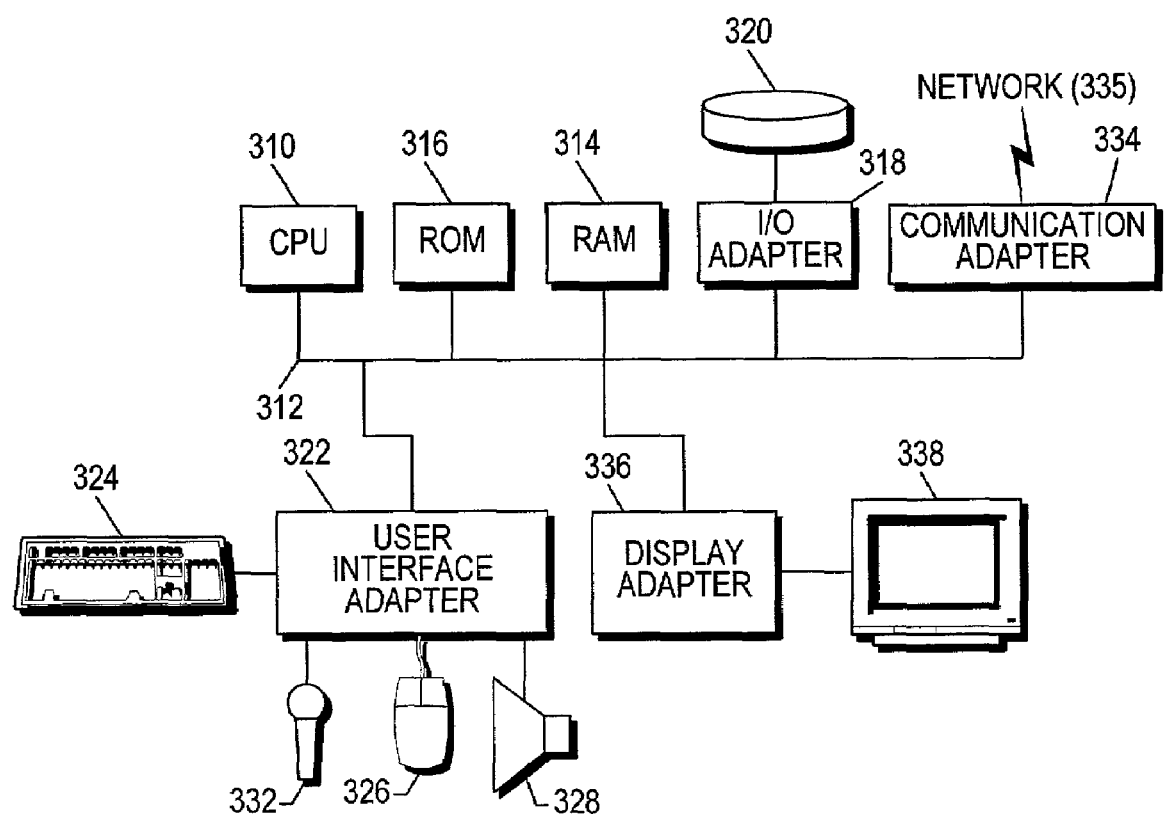
FIG. 3 shows a representative hardware environment that may be associated with the data servers and user devices of FIG. 2, in accordance with one embodiment.

FIG. 3 shows a representative hardware environment that may be associated with the data server 214 and user devices 216, 217 of FIG. 2, in accordance with one embodiment. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a computer readable medium and may include a Random Access Memory (RAM) 314, Read only Memory (ROM) 316, and an I/O adapter 318 for connecting peripheral devices such as disk storage units 320 to the bus 312. The workstation shown in FIG. 3 also includes a user interface adapter 322 for connecting a keyboard 324, a mouse 326, a speaker 328, a microphone 332, and/or other user interface devices such as touch screen and a digital camera (not shown) to the bus 312, communication adapter 334 for connecting the workstation to a communication network 335 (e.g., data processing network) and a display adapter 336 for connecting the bus to a display device 338.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 1:
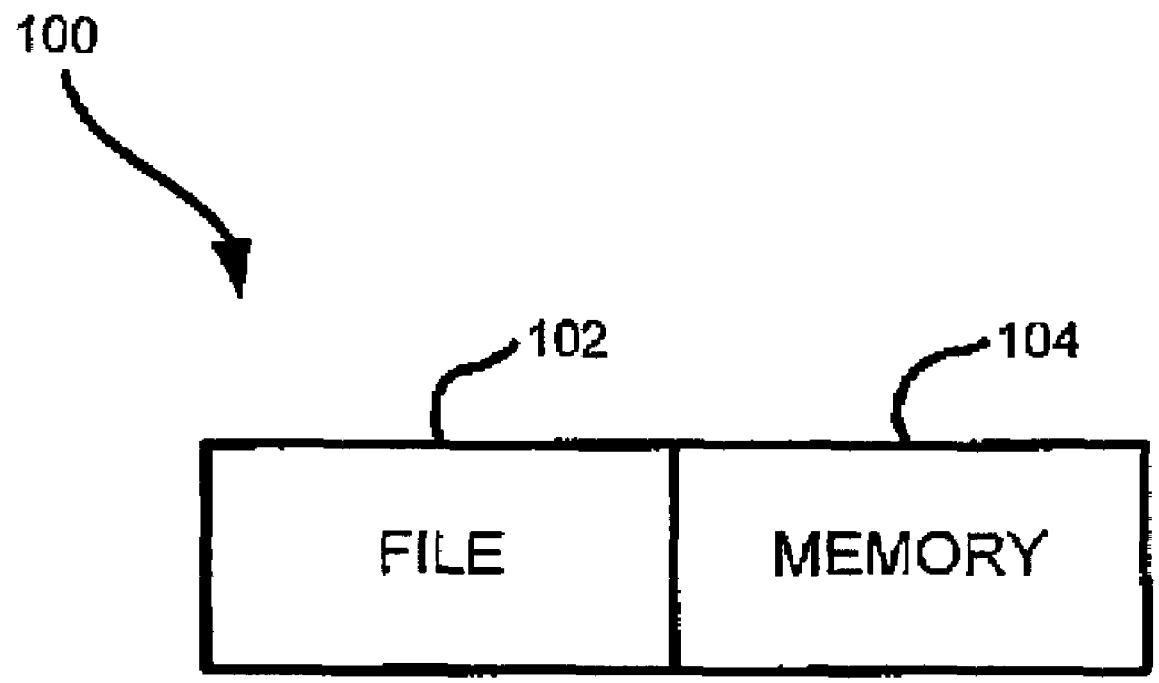
FIG. 1 is a representation of a typical virus signature according to the prior art."
Figure 4:
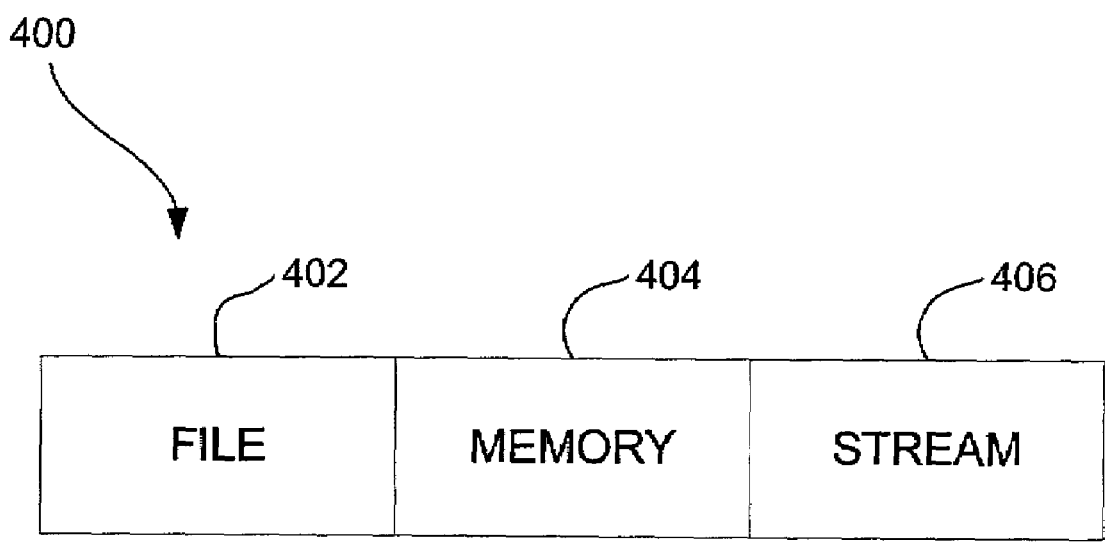
FIG. 4 depicts an extended signature of an instance of malicious code according to one embodiment.

In contrast to FIG. 1, discussed above, FIG. 4 depicts an extended signature 400 of an instance of malicious code according to one embodiment. As shown, the signature 400 includes a file component 402 used during scanning of a file system and a memory component 404 used when scanning memory of the target device, and further includes a stream component 406, which is used by the "shim" to detect malicious code in streaming data.

The stream component 406 is used to analyze streaming data entering or exiting a device or network, and includes a port signature. Each port signature indicates ports that a known instance of malicious code attempts to access. The port signature can include a single port address, a range of port addresses, a sequence of port addresses, etc. In the case of a Trojan, for example, the ports a particular Trojan is known to attempt to access are listed. Each extended signature 400 can be added to a signature file, such as a DAT file for updating scanning/monitoring software.

Figure 5:
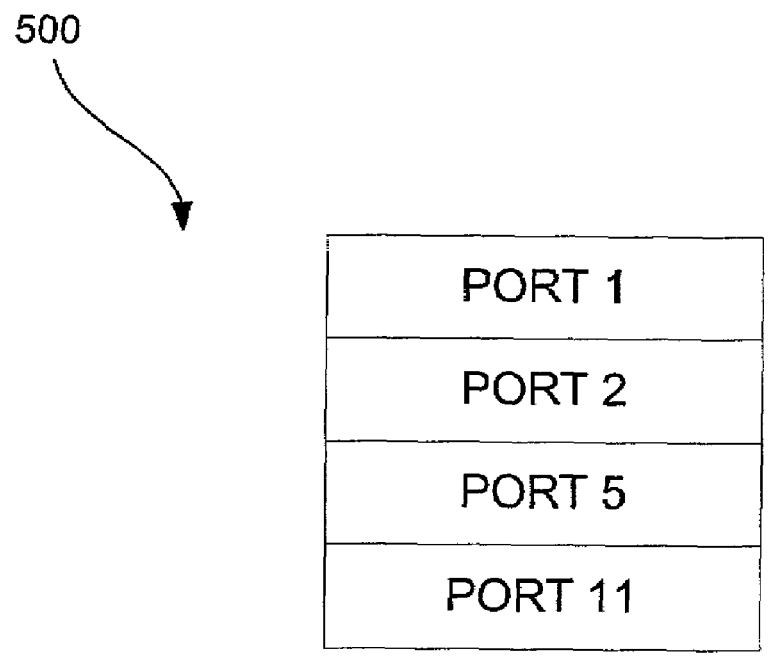
FIG. 5 illustrates an exemplary port signature of a stream component of an extended signature.

FIG. 5 illustrates an exemplary port signature 500 of a stream component of an extended signature. In this example, the signature indicates that the malicious code attempts to access ports 1, 2, 5 and 11.

Figure 6:
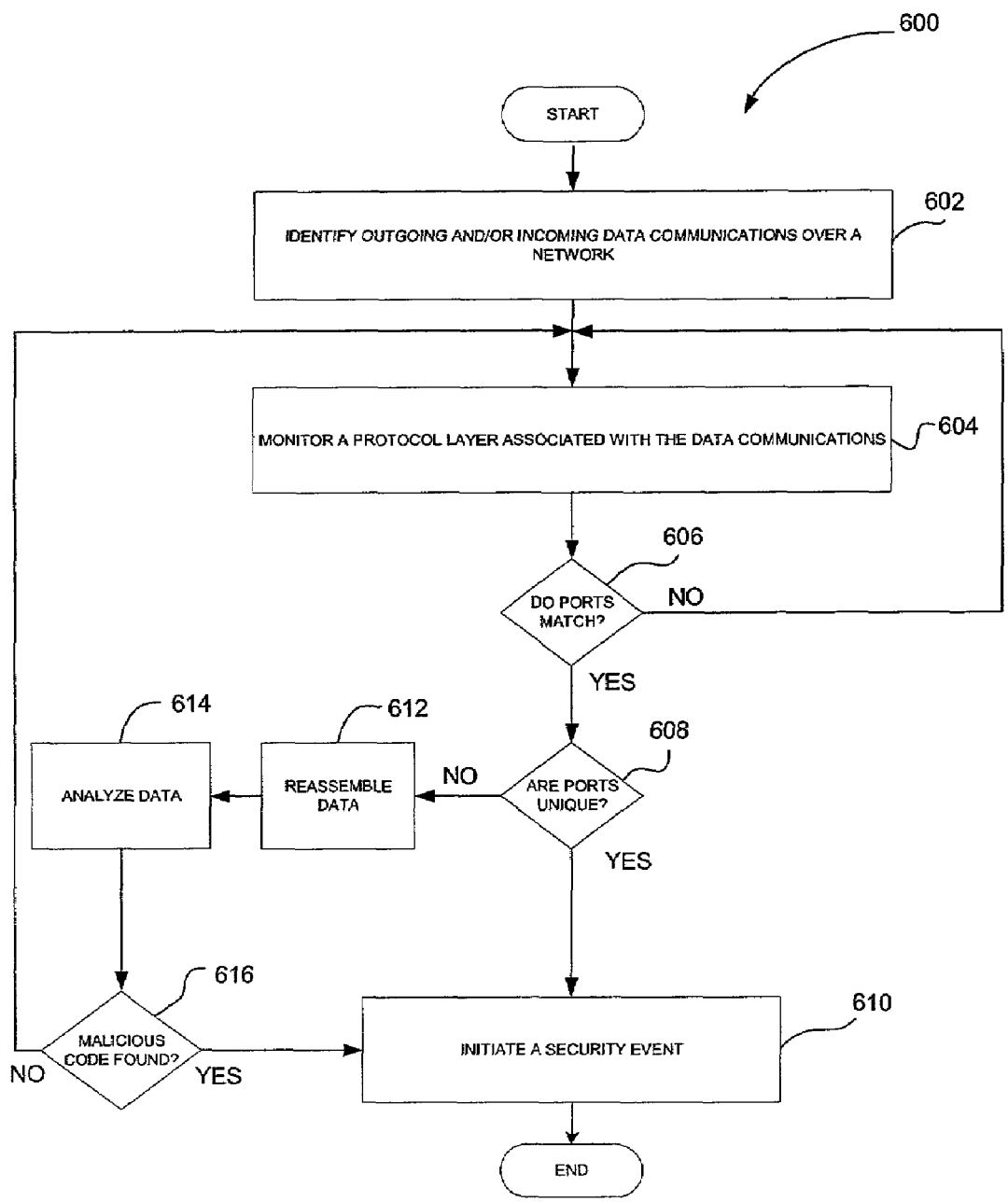
FIG. 6 is a flow diagram of a process for detecting network activity governed by malicious code.

FIG. 6 is a flow diagram of a process 600 for detecting network activity governed by malicious code. In operation 602, incoming and/or outgoing data communications are identified. The data communications may be incoming from a remote device via a remote network 204, 206 or outgoing from a local device 214, 216, 217. See FIG. 2.

With continued reference to FIG. 6, a protocol layer, or shim, associated with the data communications is monitored in operation 604. Streaming data, whether incoming or outgoing, is monitored using the signature files for detecting anomalous or predefined behavior such as attempts to access multiple communications ports. Note that the monitoring may also include scanning for malicious code. The monitoring and scanning can be managed by a gateway scanner 218, a server 214, a user device (or client) 216, 217, and/or any other network element. See FIG. 2.

Figure 7:
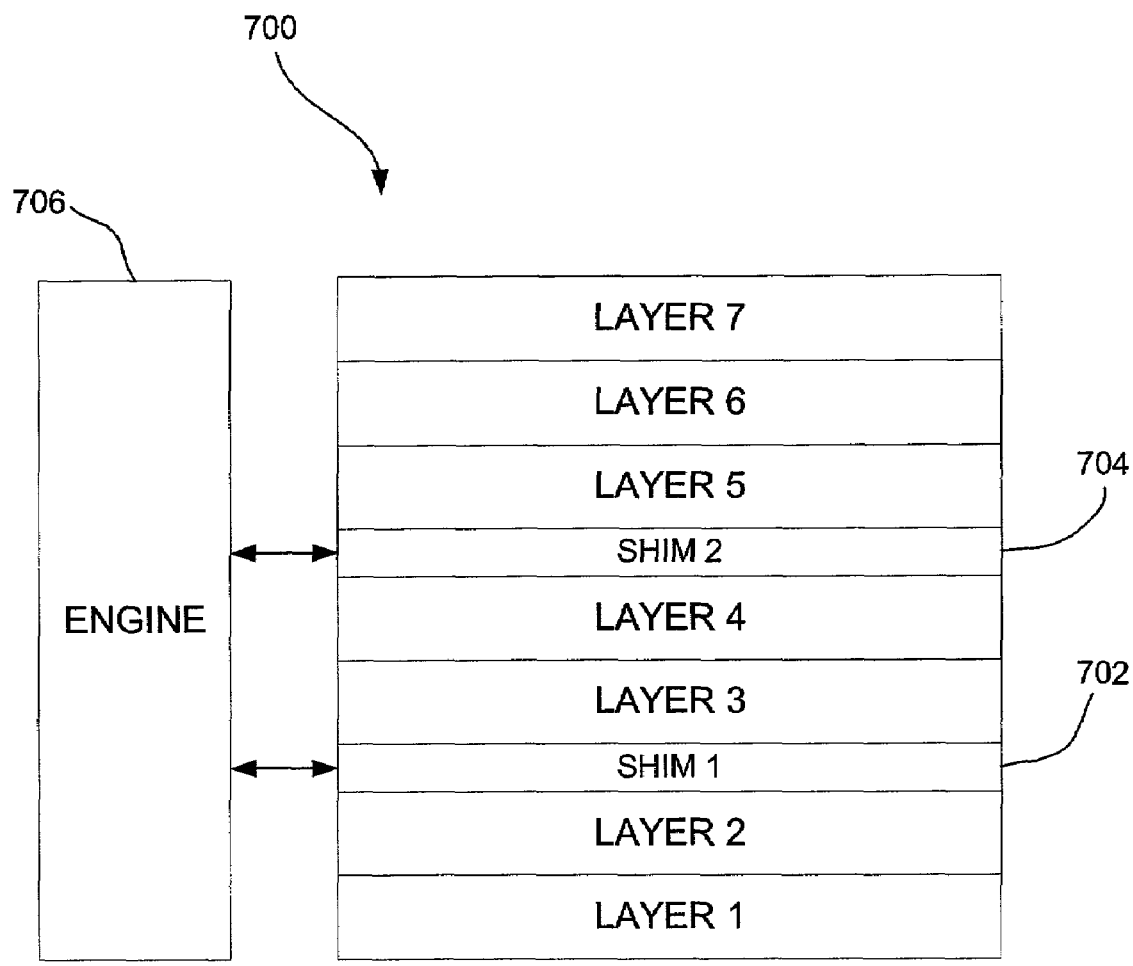
FIG. 7 depicts a network layer stack having the seven OSI (Open Systems Interconnection) standard layers and two protocol layers according to one embodiment.

As mentioned above, the monitoring is preferably conducted using a protocol layer, or shim, positioned at a particular layer in a network layer stack. FIG. 7 depicts a network layer stack 700 having the seven Open Systems Interconnection (OSI) standard layers and two protocol layers, or shims, 702, 704, according to an embodiment of the present embodiment. Each protocol layer is managed and monitored by anti-virus software 706 running on the network element responsible for the monitoring.

OSI is a standard description or "reference model" for how messages may be transmitted between any two points in a telecommunication network, and is used herein by way of example. The OSI reference model defines seven layers of functions that take place at each end of a communication.

The layers are in two groups. The upper four layers are used whenever a message passes from or to a user. The lower three layers (up to the "network layer") are used when any message passes through the host computer. Messages intended for the host computer pass to the upper layers. Messages destined for some other host are not passed up to the upper layers but are forwarded to another host. The seven layers are:

Layer 7: The application layer—This is the layer at which communication partners are identified, quality of service is identified, user authentication and privacy are considered, and any constraints on data syntax are identified.

Layer 6: The presentation layer—This is a layer, usually part of an operating system, that converts incoming and outgoing data from one presentation format to another (for example, from a text stream into a popup window with the newly arrived text). It is sometimes called the syntax layer.

Layer 5: The session layer—This layer sets up, coordinates, and terminates conversations, exchanges, and dialogs between the applications at each end. It deals with session and connection coordination.

Layer 4: The transport layer—This layer manages the end-to-end control (for example, determining whether all packets have arrived) and error-checking. It ensures complete data transfer.

Layer 3: The network layer—This layer handles the routing of the data (sending it in the right direction to the right destination on outgoing transmissions and receiving incoming transmissions at the packet level). The network layer performs routing and forwarding.

Layer 2: The data-link layer—This layer provides synchronization for the physical level and does bit-stuffing for strings of 1's in excess of 5. It furnishes transmission protocol knowledge and management.

Layer 1: The physical layer—This layer conveys the bit stream through the network at the electrical and mechanical level. It provides the hardware means of sending and receiving data on a carrier.

As shown in FIG. 7, one protocol layer 702 of the present embodiment is positioned between layers 2 and 3, where raw data enters the network. This allows the present embodiment to monitor raw data. The other protocol layer 704 is positioned between layers 4 and 5, where packet reassembly has already taken place. Thus both raw data and the reassembled data can be monitored.

Referring again to FIG. 6, upon detecting anomalous behavior and/or suspect code in operation 604, a determination is made in operation 606 as to whether any data communications are prompted by malicious code. This is done by examining the stream of data coming in on the network, which can be raw protocol data or textual information (binary), for example. The stream is analyzed for protocol matches and/or binary matches using the stream components of the signatures of the signature file. The port signatures are also checked against the data.

For example, a signature of a known Trojan includes ports 1, 2, 5 and 11. Upon detecting that data is attempting to access ports 1, 2, 5 and 11, the process continues on to operation 608. If the data is attempting to access ports 1, 3, 5, and 7 (and no other signature match is found in the signature file), operation 604 is repeated for the next portion of data.

If the data is attempting to access ports 1, 2, 5, and 10, and no signature match is found but enough of the numbers match to arouse suspicion, the process can continue to operation 608 and/or further analysis may be performed to determine if the data includes a new instance of malicious code or a variant thereof. Likewise, if an unusual or suspect port request is detected, the process can continue to operation 608 and/or further analysis may be performed to determine if the data includes a new instance of malicious code or a variant thereof. As an option, the system can be used to identify the threat's actions, i.e. accessing a port to go out on, and report this through a user interface to the user and get a response from the user as to what action he or she would like to take. As another option, the suspect code can be forwarded to research for analysis by a human operator to determine whether the suspect code is a new instance of malicious code or a variant of an existing one.

The present embodiment preferably distinguishes between seldom-used ports and commonly used ports in order to improve efficiency. In operation 608, a determination is made as to whether the ports requested by the data are unique, i.e., uncommon or not heavily used. Designation of ports as unique can be specified by a user, discerned from usage, etc. If the ports are unique, a security event is initiated in operation 610.

The security event of operation 610 can include dropping the connection through which the data is being transmitted and/or closing the port. The length of time the port is closed can be for a predetermined period of time.

The security event may also include discarding the packet having the malicious code. The security event can also include disabling the application transmitting or file being transmitted. Further, the security event can include sending an Internet Control Message Protocol (ICMP) redirect and pointing the data transmission to another location.

By scanning for seldom-used ports upon finding a match in operation 606, the efficiency of the process is greatly increased, as security events can be initiated for known malicious code prior to any further processing. For common ports, where data traffic is heavier, more processing may be required.

If the ports are not unique, i.e., common, the stream data is extracted (if necessary) and reassembled in operation 612 and analyzed in operation 614 in a conventional manner using the file and/or memory components of the virus signatures in the signature file. At decision 616, if malicious code is found in operation 614, the security event of operation 610 is initiated. Known virus scanning software can be used in the analysis of operation 614.

As an option, the streaming data can be captured and suspect malicious code run on a "goat" machine to identify whether it contains malicious code. The suspect data is launched into memory and allowed to attempt to infect "goat" files and/or perform their intended functions. Goat files are files that have known properties, i.e., it is known exactly what they are, what they look like, and what they do. Whether the replication is successful is determined by whether the goat files have been modified in some manner. If the suspect code is allowed to perform its intended functions, these functions are monitored to determine whether the activities are consistent with malicious activity.

According to a preferred embodiment, the process may be set to run in known unique Trojan port mode for processing efficiency. In such case, data matching common ports is either allowed to pass through the scanner or the user can be notified of the suspicious activity and allowed to determine whether any further action is required, with or without disruption of data transmission.

Figure 8:
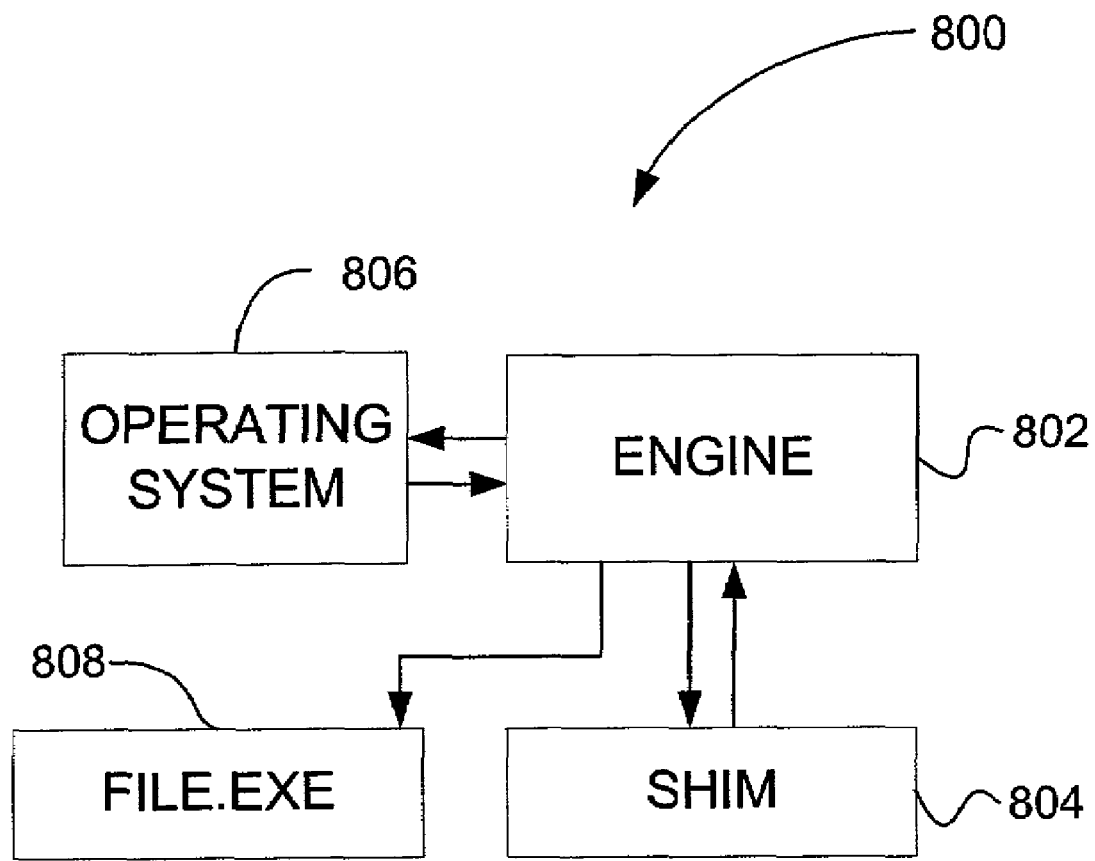
FIG. 8 illustrates an exemplary system for detecting malicious network activity according to one embodiment.

FIG. 8 illustrates an exemplary system 800 for detecting malicious network activity according to one embodiment. Data traversing the network is monitored by an anti-virus engine 802 at a shim 804, as described above. The engine 802 determines that data that has gone through the shim 804 is generating activity on ports 1, 2, 5, and 11, and that this matches one of the extended signatures. The engine 802 queries the operating system 806 as to which application is sending data to ports 1, 2, 5 and 11. The operating system 806 returns the name of the application as "file.exe" 808 and its location, and/or the file itself, so that the engine 802 can access and scan the file. The engine 802 then examines file.exe 808 to determine whether it contains malicious code, such as a known Trojan. If it does, a security event is initiated, as set forth above in the discussion of operation 610 of FIG. 6.

Referring again to FIG. 8, if the engine 802 cannot determine whether file.exe 808 contains malicious code, it 802 monitors file.exe 808 to see if it attacks the ports. If it does, a security event is initiated. One of the benefits of this implementation is that a network system does not need an exit scanner.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for detecting network activity governed by malicious code, comprising:
monitoring two protocol layers associated with data communications over a network, wherein a first of the protocol layers is positioned between OSI standard layers 2 and 3, and a second of the protocol layers is positioned between OSI standard layers 4 and 5, the protocol layers being maintained by anti-malicious code software;
determining whether the data communications are prompted by malicious code based on the monitoring; and
initiating a security event upon determining that the data communications are prompted by malicious code;
wherein the determination of whether the data communications are prompted by malicious code includes: analyzing port numbers to which the data communications are being sent, determining whether the port numbers are unique or non-unique, initiating the security event if the port numbers are determined to be unique, performing further processing if the port numbers are determined to be non-unique, and conditionally performing the security event based on the further processing, the further processing including reassembling data of the data communications and scanning the reassembled data for malicious code.

2. The method as recited in claim 1, wherein the data communications are incoming data communications.

3. The method as recited in claim 1, wherein the data communications are outgoing data communications.

4. The method as recited in claim 1, wherein the data communications include streaming data.

5. The method as recited in claim 1, wherein the security event includes at least one of: terminating the data communications, discarding a packet of the data communications, and redirecting the data communications.

6. The method as recited in claim 1, wherein a signature file is used to determine whether the data communications are prompted by malicious code, wherein the signature file includes multiple signatures of malicious code, wherein at least a portion of the signatures include port data.

7. The method as recited in claim 1, wherein the first protocol layer includes a shim positioned between the OSI standard layers 2 and 3, the shim being maintained, managed, and monitored by the anti-malicious code software.

8. The method as recited in claim 1, wherein the second protocol layer includes a shim positioned between the OSI standard layers 4 and 5, the shim being maintained, managed, and monitored by the anti-malicious code software.

9. The method as recited in claim 1, wherein the security event is initiated without the further processing in response to a determination that the port numbers are unique.

10. The method as recited in claim 1, wherein the further processing is avoided in response to a determination that the port number are unique.

11. The method as recited in claim 1, wherein a designation of ports as being unique is specified by a user.

12. The method as recited in claim 1, wherein a designation of ports are being unique is discerned from usage.

13. A computer program product embodied on a computer readable medium for detecting network activity governed by malicious code, comprising:
computer code for monitoring two protocol layers associated with data communications over a network, wherein a first of the protocol layers is positioned between OSI standard layers 2 and 3, and a second of the protocol layers is positioned between OSI standard layers 4 and 5, the protocol layers being maintained by anti-malicious code software;

computer code for determining whether the data communications are prompted by malicious code based on the monitoring; and computer code for initiating a security event upon determining that the data communications are prompted by malicious code;

wherein the determination of whether the data communications are prompted by malicious code includes: analyzing port numbers to which the data communications are being sent, determining whether the port numbers are unique or non-unique, initiating the security event if the port numbers are determined to be unique, performing further processing if the port numbers are determined to be non-unique, and conditionally performing the security event based on the further processing, the further processing including reassembling data of the data communications and scanning the reassembled data for malicious code.

14. A system for detecting network activity governed by malicious code, comprising:

hardware for monitoring two protocol layers associated with data communications over a network, wherein a first of the protocol layers is positioned between OSI standard layers 2 and 3, and a second of the protocol layers is positioned between OSI standard layers 4 and 5, the protocol layers being maintained by anti-malicious software;

hardware for determining whether the data communications are prompted by malicious code based on the monitoring; and hardware for initiating a security event upon determining that the data communications are prompted by malicious code;

wherein the determination of whether the data communications are prompted by malicious code includes: analyzing port numbers to which the data communications are being sent, determining whether the port numbers are unique or non-unique, initiating the security event if the port numbers are determined to be unique, performing further processing if the port numbers are determined to be non-unique, and conditionally performing the security event based on the further processing, the further processing including reassembling data of the data communications and scanning the reassembled data for malicious code.

15. A method for detecting network activity governed by malicious code, comprising:

monitoring two protocol layers associated with data communications over a network, wherein a first of the protocol layers is positioned between OSI standard layers 2 and 3, and a second of the protocol layers is positioned between OSI standard layers 4 and 5, the protocol layers being maintained by anti-malicious software;

analyzing port numbers to which the data communications are being sent utilizing a signature file having port signatures;

determining whether the data communications are prompted by malicious code based on the analysis; and initiating a security event upon determining that the data communications are prompted by malicious code, wherein the security event is initiated upon matching of unique port numbers with a signature of the signature file;

wherein further processing occurs upon matching of a non-unique port number with a signature of the signature file, the further process including reassembling data of the data communications and scanning the reassembled data for malicious code.

16. The method as recited in claim 15, wherein the data communications are incoming data communications.

17. The method as recited in claim 15, wherein the data communications are outgoing data communications.

18. The method as recited in claim 15, wherein the security event includes at least one of: terminating the data communications, discarding a packet of the data communications, and redirecting the data communications.

19. The method as recited in claim 15, wherein a signature file is used to determine whether the data communications are prompted by malicious code, wherein the signature file includes multiple signatures of malicious code, wherein at least a portion of the signatures include port data.

20. A computer program product embodied on a computer readable medium for detecting network activity governed by malicious code, comprising:

computer code for monitoring two protocol layers associated with data communications over a network, wherein a first of the protocol layers is positioned between OSI standard layers 2 and 3, and a second of the protocol layers is positioned between OSI standard layers 4 and 5, the protocol layers being maintained by anti-malicious software;

computer code for analyzing port numbers to which the data communications are being sent utilizing a signature file having port signatures;

computer code for determining whether the data communications are prompted by malicious code based on the analysis; and computer code for initiating a security event upon determining that the data communications are prompted by malicious code, wherein the security event is initiated upon matching of unique port numbers with a signature of the signature file;

wherein further processing occurs upon matching of a non-unique port number with a signature of the signature file, the further process including reassembling data of the data communications and scanning the reassembled data for malicious code.

21. A system for detecting network activity governed by malicious code, comprising:

hardware for monitoring two protocol layers associated with streaming data communications over a network, wherein a first of the protocol layers is positioned between OSI standard layers 2 and 3, and a second of the protocol layers is positioned between OSI standard layers 4 and 5, the protocol layers being maintained by anti-malicious code software;

hardware for analyzing port numbers to which the data communications are being sent utilizing a signature file having port signatures;

hardware for determining whether the data communications are prompted by malicious code based on the analysis; and hardware for initiating a security event upon determining that the data communications are prompted by malicious code, wherein the security event is initiated upon matching of unique port number with a signature of the signature file;

wherein further processing occurs upon matching of a non-unique port number with a signature of the signature file, the further processing including reassembling data of the data communication and scanning the reassembled data for malicious code.

22. A method for detecting network activity governed by malicious code, comprising:

monitoring two protocol layers associated with incoming and outgoing streaming data communications over a network, wherein a first of the protocol layers is positioned between OSI standard layers 2 and 3, and a second of the protocol layers is positioned between OSI standard layers 4 and 5, the protocol layers being maintained by anti-malicious software;

analyzing port numbers to which the data communications are being sent utilizing a signature file having port signatures;

determining whether the data communications are prompted by malicious code based on the analysis; and initiating a security event upon determining that the data communications are prompted by malicious code, wherein the security event is initiated upon matching of unique port numbers with a signature of the signature file;

wherein further processing occurs upon matching of a non-unique port number with a signature of the signature file, the further process including reassembling data of the data communications and scanning the reassembled data for malicious code.

23. A method for detecting network activity governed by malicious code, comprising:

monitoring two protocol layers associated with incoming and outgoing streaming data communications over a network, wherein a first of the protocol layers is positioned between OSI standard layers 2 and 3, and a second of the protocol layers is positioned between OSI standard layers 4 and 5, the protocol layers being maintained by anti-malicious software;

analyzing port numbers to which the data communications are being sent utilizing a signature file having port signatures;

determining whether the data communications are prompted by malicious code based on the analysis; and initiating a security event upon determining that the data communications are prompted by malicious code, the security event being initiated upon matching of unique port numbers with a signature of the signature file, the security event including at least one of: terminating the data communications, discarding a packet of the data communications, and redirecting the data communications; and prompting further processing upon matching of a non-unique port number with a signature of the signature file, the further process including reassembling data of the data communications and scanning the reassembled data for malicious code.

24. A method for detecting network activity governed by malicious code, comprising:

monitoring a protocol layer associated with data communications over a network;

determining whether the data communications are prompted by malicious code based on the monitoring; and initiating a security event upon determining that the data communications are prompted by malicious code;

wherein the determination of whether the data communications are prompted by malicious code includes: analyzing port numbers to which the data communications are being sent, determining whether the port numbers are unique or non-unique, initiating the security event if the port numbers are determined to be unique, performing further processing if the port numbers are determined to be non-unique, and conditionally performing the security event based on the further processing, the further processing including reassembling data of the data communications and scanning the reassembled data for malicious code;

wherein a plurality of protocol layers are monitored comprising a first shim positioned between OSI standard layers 2 and 3, and a second shim positioned between OSI standard layers 4 and 5, the first shim and the second shim both being maintained, managed, and monitored by anti-malicious code software.

* * * * *